Feb. 23, 1954  D. L. McKAY  2,670,083
REMOVAL OF FILTRATE FROM FILTER CAKES
Filed Oct. 28, 1949
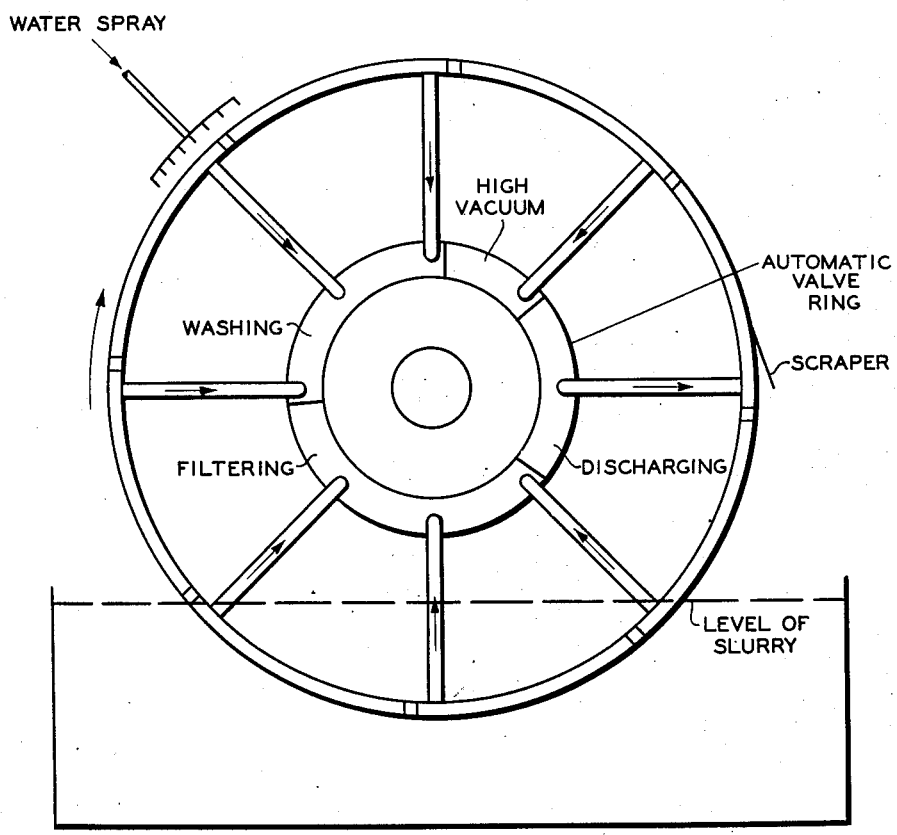
INVENTOR.
D.L. McKAY
BY
Hudson and Young
ATTORNEYS Patented Feb. 23, 1954

2,670,083

UNITED STATES PATENT OFFICE 2,670,083

REMOVAL OF FILTRATE FROM FILTER CAKES

Dwight L. McKay, Bartlesville, Okla., assignor to Phillips Petroleum Company, a corporation of Delaware Application October 28, 1949, Serial No. 124,083

10 Claims. (Cl. 210—201)

The present invention relates to the art of filtration. In one aspect it relates to the purification of certain solid, sub-divided substances, for example hydrocarbons, by crystallization and filtration. In another aspect it relates to the continuous purification of substances by filtration or separation of these substances from, say, mother liquors in which said substances have been crystallized or from a liquid in which said substances are contained. In still another of its aspects the invention relates to the crystallization and continuous filtration of certain solid sub-divided substances, for example hydrocarbons, employing reduced pressure or vacuum. In one embodiment of the invention hydrocarbons are crystallized and filtered on a continuous rotary vacuum filter in an improved manner or method which will be set forth below.

The use of various solvents to wash mother liquor from crystals which are being filtered is known. At lower temperatures required to maintain certain substances in a crystalline form, solvents have been selected which remain liquid at the filtration temperature.

An object of the invention is to provide an improved method of purification of substances by filtration or separation.

A further object of this invention is to provide a method for purification of substances by filtration without having to employ expensive solvents as washes even when the filtering operation must be effected at a low temperature to avoid melting of the desired product.

Another object of the invention is to provide an improved method for the purification of hydrocarbons by crystallization and separation or filtration of the crystals from the mother liquor employing reduced pressure or vacuum.

Still another object of the invention is to provide a method for improving the separation of occluded liquid from the substances filtered.

Still a further object of the invention is to provide a method for making more effective whatever reduced pressure is employed in the process thereof.

Other objects and advantages are apparent from this disclosure and its appended claims.

As stated, the invention is applicable to the separation or filtration of substances. A reduced pressure or vacuum is employed in the preferred operations. The invention is applicable to batch or continuous operation. However, continuous vacuum operation is now preferred. Therefore, the invention will be disclosed as applied to continuous vacuum operation. Exemplary of such operation is that of the continuous rotary vacuum filter. Accordingly the invention is described as applied to such a filter. Furthermore, the method of the invention is applicable with advantage to the filtration and purification of hydrocarbons. One filtration to which the method is particularly applicable is the separation of benzene from n-heptane. Therefore, the invention will be described as applied to perform said separation of benzene from n-heptane, employing a continuous rotary vacuum filter.

According to the invention there is provided a method of filtering a sub-divided solid material from a liquid in which it is contained which comprises applying to said material while it is being filtered a fluid which is immiscible with said liquid and which will solidify on said material at the filtering temperature. If the fluid is separable from the filtered material but solid at the filtering temperature it need not, necessarily, be immiscible therewith at all or at any temperature. As applied to the filtering of crystals of benzene from a benzene-normal heptane slurry, the invention comprises applying to the benzene crystals water which will displace the occluded n-heptane from the benzene crystals and will freeze thereon to facilitate the separation therefrom of the n-heptane. Furthermore, when operating according to the preferred embodiment of the invention in which reduced pressure or a vacuum is employed, and as an especially important feature thereof, the water freezing upon the benzene crystals serves to permit attainment of a considerably higher degree of vacuum, thus permitting removal of impurities and occluded liquids without requiring recourse to expensive solvents.

To more fully describe the invention, reference is now made to the drawing which indicates schematically the application of a water spray to a conventional rotary filter adapted to perform a process according to the invention. Rotary vacuum filters are well-known in the art and usually comprise a horizontal compartmented drum which is caused to rotate in a shallow pan or tank which contains the slurry to be filtered. This drum is so valved and compartmented that its portion passing through the slurry exerts a suction upon the slurry, causing it to cling to the drum. Also, the compartments and valving are so arranged and adapted as to continue the exertion of a vacuum upon the cake through a washing step. Then, as the drum rotates a slight air pressure can be applied to coact with a knife or scraper to remove the cake. The material being treated is benzene which is to be separated from n-heptane. A rotary vacuum filter which operates based upon a pressure differential across the filter cake and which can be adapted to perform the process of this invention is described in "Elements of Chemical Engineering," Badger and McCabe, pages 484–487.

According to the invention, a cake of benzene crystals is picked up from the pan onto the drum by means of the low vacuum in the portion of the drum in the pan. Then, a water spray is applied to the cake. The temperature of the benzene upon the drum is maintained sufficiently low to retain the crystalline form and to cause the water sprayed upon the benzene crystals to form a layer of ice thereon not only displacing n-heptane occluded therein but also reducing the size of the inter-crystal spaces. This will permit attainment of a considerably higher vacuum as well as an increased draining of the filter cake. Therefore, the drum is so arranged that the iced crystals or cake is subjected to an increased vacuum. Following this stage of the filtration, the filtered cake is scraped from the drum, its removal being assisted by a slight super-atmospheric pressure applied from within. The cake is allowed to warm, whereupon the ice melts and the water formed is easily separated from the benzene, for example by decanting.

*Example I*

A benzene-normal heptane slurry was filtered. The crystals in the filter-cake before washing contained 75 weight per cent of benzene. Upon blocking the cake of crystals with water when the cake was at a temperature of minus 61° F., the benzene content of the cake was increased readily to 92 weight per cent.

*Example II*

A slurry of para-xylene crystals in meta-xylene was filtered. Before blocking the crystalline filter cake contained 68 weight per cent paraxylene. After blocking the cake with distilled water when the cake was at a temperature of minus 62° F. the paraxylene content of the cake was increased to 93 weight per cent.

From the foregoing it is evident that a considerable improvement was obtained employing the water spray to lay down an ice coating upon the crystals according to the invention.

It is preferred to exercise control of the quantity water sprayed upon the cake so as to provide a relatively thin layer of ice over the crystals of the entire filter cake. This control is readily accomplished by correlating the rate of rotation of the drum, the crystal size and rate of water spray. The best conditions can be determined by mere routine test.

It will be understood that materials other than water can be employed together with materials still other than benzene. Thus, carbon dioxide, iodine and other materials might well serve as coating agents while benzene might also serve as such when water is the mother liquor. The invention is essentially physical, as distinguished from chemical, in nature and equivalents can easily be selected by those skilled in the art. Obviously the equivalents are to be selected which are substantially inert in respect of the filter cake under the conditions of operation. Furthermore, it is within the scope of the invention to employ a coating of a material which though it is not always immiscible with the crystals being filtered, it is substantially solid at the filtering temperature and readily separable therefrom when admixture has occurred.

Variation and modification are possible within the scope of the foregoing disclosure and the appended claims to the invention the essence of which is that by applying to a sub-divided solid being filtered from a liquid a fluid which is substantially solid thereon at the filtering temperature an important increase in the separation of said liquid from said solid has been accomplished, particularly when a higher vacuum, which is made possible by the invention, is employed.

I claim:

1. The improved method of filtering a sub-divided solid material from a liquid in which it is contained which comprises the steps of forming a filterable cake with said subdivided solid material, maintaining said cake at a temperature at which a fluid to be applied defined later herein, will solidify, applying a fluid to said cake which fluid will solidify in the interstices of said solid material at the temperature of filtration, said fluid being immiscible with and inert in respect of said liquid and solid at the temperature of filtration, thus reducing the size of the interstices, thereby forcing from said interstices during filtration a quantity of said liquid in substantial excess over the quantity which can be removed therefrom in any given operation without the employ of said fluid.

2. The method of claim 1 wherein the fluid which is applied is immiscible at ordinary temperature with the solid being filtered thus facilitating separation of said fluid and said solid at a temperature at which said fluid is not solidified.

3. The improved removal of liquid from a filter cake which is being filtered which comprises coating said cake with a fluid which is applied as a fluid but which will be solid at the temperature and pressure conditions of filtration and inert in respect of said liquid and said cake in the interstices of the cake, said fluid being immiscible with said liquid at the temperature of filtration.

4. The method of claim 3 wherein a pressure differential is applied to the coated cake to increase the rate of removal of said liquid, the said differential being in excess of that which is employable without said coating.

5. The improved method of filtering a sub-divided solid material from a liquid in which it is contained which comprises the steps of forming a filterable cake with said subdivided solid material, maintaining said cake at a temperature at which a fluid to be applied, defined later herein, will solidify, applying a fluid to said cake which fluid will solidify in the interstices of said cake at the temperature of filtration, said fluid being immiscible with and inert in respect of said liquid and solid at the temperature of filtration, thus reducing the size of the interstices, and then applying to said cake, having a reduced interstice size, a pressure differential in excess of that which is employable without said fluid solidified in said interstices.

6. The filtration of benzene crystals from a benzene-rich hydrocarbon slurry which comprises forming a filter cake of benzene crystals upon a filtering means and spraying water upon said filter cake in an amount and at a temperature such that a permeable coating of ice is formed upon the filter cake, and then filtering.

7. The method of claim 6 wherein a pressure differential is applied to the filter cake after it has been coated with ice.

8. The filtration of a slurry of para-xylene crystals is meta-xylene which comprises forming a filter cake thereof upon a filtering means and spraying water upon said filter cake, at a temperature at which water freezes, to form a permeable coating of ice upon the filter cake, and then filtering.

9. The method of claim 8 wherein a pressure differential is applied to the filter cake after it has been coated with ice.

10. The method of operating a vacuum filtration which comprises the steps of forming a cake upon a filtering surface, thus obtaining a filtrate liquid; applying to said cake upon said surface in fluid form a coating of a fluid, which is substantially solid at the filtering temperature and immiscible at said temperature with the filtrate liquid and inert in respect of said liquid and said cake at said temperature to form a permeable solid coating on said cake; and then filtering said cake further with the aid of an increased vacuum.

DWIGHT L. McKAY.

References Cited in the file of this patent

UNITED STATES PATENTS

| Number | Name | Date |
|---|---|---|
| 1,770,052 | Voorhees | July 8, 1930 |
| 2,168,140 | Schutte | Aug. 1, 1939 |
| 2,245,952 | Aitken et al. | June 17, 1941 |
| 2,301,595 | Washburn | Nov. 10, 1942 |
| 2,398,526 | Greenburg | Apr. 16, 1946 |
| 2,429,430 | Schutte | Oct. 21, 1947 |
| 2,435,792 | McArdle et al. | Feb. 10, 1948 |